US012165605B2

(12) United States Patent
Li et al.

(10) Patent No.: US 12,165,605 B2
(45) Date of Patent: Dec. 10, 2024

(54) IMAGE DISPLAY METHODS, APPARATUSES, ELECTRONIC DEVICES AND STORAGE MEDIA

(71) Applicants: Beijing BOE Optoelectronics Technology Co., Ltd., Beijing (CN); BOE Technology Group Co., Ltd., Beijing (CN)

(72) Inventors: Zhifu Li, Beijing (CN); Jinghua Miao, Beijing (CN); Wenyu Li, Beijing (CN); Mingyang Yan, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 12 days.

(21) Appl. No.: 18/265,646

(22) PCT Filed: Dec. 25, 2020

(86) PCT No.: PCT/CN2020/139436
§ 371 (c)(1),
(2) Date: Jun. 6, 2023

(87) PCT Pub. No.: WO2022/134008
PCT Pub. Date: Jun. 30, 2022

(65) Prior Publication Data
US 2024/0046891 A1 Feb. 8, 2024

(51) Int. Cl.
*G09G 3/34* (2006.01)
*G09G 3/36* (2006.01)

(52) U.S. Cl.
CPC ............ *G09G 3/3426* (2013.01); *G09G 3/36* (2013.01); *G09G 2320/0233* (2013.01); *G09G 2360/16* (2013.01)

(58) Field of Classification Search
CPC .................. G09G 3/3426; G09G 3/36; G09G 2320/0233; G09G 2360/16
See application file for complete search history.

(56) References Cited

U.S. PATENT DOCUMENTS 10,026,367 B2 7/2018 Meng et al.
10,311,808 B1 * 6/2019 Richards ............. G09G 3/3648
(Continued)

FOREIGN PATENT DOCUMENTS

CN 101673521 A 3/2010
CN 102194411 A 9/2011
(Continued)

OTHER PUBLICATIONS

PCT/CN2020/139436 international search report.
PCT/CN2020/139436 Written Opinion.

*Primary Examiner* — Sejoon Ahn
(74) *Attorney, Agent, or Firm* — IPro, PLLC

(57) ABSTRACT

An image display method is provided. The method includes: in response to receiving an $N^{th}$ frame synchronization signal, acquiring an $(N+1)^{th}$ frame image to be displayed and pixel data of pixels in the $(N+1)^{th}$ frame image to be displayed (S12); calculating backlight brightness data of a display screen according to the pixel data by a backlight algorithm (S14); in response to receiving an $(N+1)^{th}$ frame synchronization signal, synchronously sending the $(N+1)^{th}$ frame image to be displayed and the backlight brightness data to the display screen and a backlight driving board respectively (S16). In addition, the present application further discloses an image processing apparatus, an electronic device and a storage medium.

12 Claims, 6 Drawing Sheets

(56) References Cited

U.S. PATENT DOCUMENTS

| | | | | |
|---|---|---|---|---|
| 2005/0083280 | A1* | 4/2005 | Hiraki | G09G 3/342 345/87 |
| 2008/0117152 | A1* | 5/2008 | Hsu | G09G 3/3406 345/89 |
| 2009/0079754 | A1* | 3/2009 | Chen | G09G 3/20 345/589 |
| 2009/0251399 | A1* | 10/2009 | Kim | G09G 3/3406 382/169 |
| 2009/0274389 | A1* | 11/2009 | Yamamoto | H04N 21/4318 382/274 |
| 2010/0245398 | A1* | 9/2010 | Amino | G09G 5/10 345/213 |
| 2011/0050754 | A1* | 3/2011 | Hyun | G09G 3/20 345/690 |
| 2014/0375695 | A1* | 12/2014 | Chang | G09G 5/10 345/690 |
| 2015/0364095 | A1 | 12/2015 | Zhang | |
| 2017/0277304 | A1* | 9/2017 | Li | G09G 5/00 |
| 2017/0278444 | A1* | 9/2017 | Tien | G09G 3/2092 |
| 2017/0278447 | A1* | 9/2017 | Yaras | G09G 3/2044 |
| 2017/0278458 | A1* | 9/2017 | Wang | G09G 3/3258 |
| 2017/0280094 | A1* | 9/2017 | Ito | G03B 21/14 |
| 2018/0322823 | A1* | 11/2018 | Alousi | G09G 3/2096 |
| 2019/0310521 | A1* | 10/2019 | Chen | G02F 1/13306 |
| 2022/0310001 | A1* | 9/2022 | Youn | G09G 5/10 |

FOREIGN PATENT DOCUMENTS

| | | | |
|---|---|---|---|
| CN | 103050095 | A | 4/2013 |
| CN | 104050944 | A | 9/2014 |

* cited by examiner

IMAGE DISPLAY METHODS, APPARATUSES, ELECTRONIC DEVICES AND STORAGE MEDIA

CROSS-REFERENCE TO RELATED APPLICATIONS

This application is a national stage of international PCT Application No. PCT/CN2020/139436 filed on Dec. 25, 2020, the entire contents of which are incorporated herein by reference.

TECHNICAL FIELD

The present application relates to the field of image display, and in particular, to an image display method, an image processing apparatus, an electronic device and a storage medium.

BACKGROUND

With the development of display technology, the size and resolution of a screen are constantly improved, and accordingly, the consumption of electric energy is increased. At present, the backlight of a liquid crystal display in the market is a whole backlight, which needs to be lighted all the time, resulting in unnecessary waste. Moreover, because the screen is large, the picture of the television screen will be relatively bright as a whole, and watching it for a long time will cause discomfort to the human body.

SUMMARY

In view of this, the present application provides an image display method, an image processing apparatus, an electronic device and a storage medium.

The image display method of the embodiments of the present application includes:

- in response to receiving an $N^{th}$ frame synchronization signal, acquiring an $(N+1)^{th}$ frame image to be displayed and pixel data of pixels in the $(N+1)^{th}$ frame image to be displayed;
- calculating backlight brightness data of a display screen according to the pixel data by a backlight algorithm; and
- in response to receiving an $(N+1)^{th}$ frame synchronization signal, synchronously sending the $(N+1)^{th}$ frame image to be displayed and the backlight brightness data to the display screen and a backlight driving board respectively.

In some embodiments, the $(N+1)^{th}$ frame image to be displayed includes a plurality of image sub-regions, each of the plurality of image sub-regions includes a plurality of pixels, the display screen includes a plurality of backlight block units, and the plurality of image sub-regions are in one-to-one correspondence with the plurality of backlight block units, and calculating the backlight brightness data of the display screen according to the pixel data by the backlight algorithm includes:

- for each of the plurality of image sub-regions, counting a number of pixels with pixel brightness values greater than 0 in the image sub-region;
- in response to determining that the number of the pixels with pixel brightness values greater than 0 in the image sub-region is greater than a first threshold, determining that the backlight block unit corresponding to the image sub-region is turned on; and

- in response to determining that the number of the pixels with pixel brightness values greater than 0 in the image sub-region is not greater than the first threshold, determining that the backlight block unit corresponding to the image sub-region is turned off.

In some embodiments, counting the number of the pixels with pixel brightness values greater than 0 in the image sub-region includes:

- for each of pixels in the image sub-region, obtaining a maximum brightness of sub-pixel data of the pixel;
- determining the maximum brightness as the corresponding pixel brightness value of the pixel.

In some embodiments, determining that the backlight block unit corresponding to the image sub-region is turned on includes:

- determining backlight brightness data of the backlight block unit according to pixel brightness values of pixels in the image sub-region.

In some embodiments, determining the backlight brightness data of the backlight block unit according to the pixel brightness values of the pixels in the image sub-region includes:

- calculating an average pixel brightness value of the pixels in the image sub-region corresponding to the backlight block unit;
- sorting the pixel brightness values of the pixels in the image sub-region to obtain pixel brightness values in a first preset sequence; and
- obtaining the backlight brightness data of the backlight block unit according to the pixel brightness values in the first preset sequence, the average pixel brightness value, and an interpolation between the pixel brightness values in the first preset sequence and the average pixel brightness value.

In some embodiments, the number of backlight driving boards is multiple, the display screen further includes a plurality of display sub-regions, each of the plurality of display sub-regions corresponds to a plurality of backlight block units, and each of the plurality of display sub-regions is provided with one of the plurality of backlight driving boards, and synchronously sending the $(N+1)^{th}$ frame image to be displayed and the backlight brightness data to the display screen and the backlight driving board respectively includes:

- synchronously sending the backlight brightness data to the plurality of backlight driving boards respectively.

In some embodiments, the image display method further includes: for each of the plurality of backlight driving boards, controlling the backlight driving board to scan line by line according to the backlight brightness data, so as to drive a plurality of backlight block units corresponding to one of the plurality of display sub-regions.

In some embodiments, the display screen includes a plurality of pixel units, the plurality of pixel units correspond to pixels in the $(N+1)^{th}$ frame image to be displayed, and the image display method further includes:

- controlling the display screen to scan line by line to drive the plurality of pixel units to display the $(N+1)^{th}$ frame image to be displayed.

The image processing apparatus according to the embodiments of the present application includes:

- an acquiring module, configured to in response to receiving an $N^{th}$ frame synchronization signal, acquire an $(N+1)^{th}$ frame image to be displayed and pixel data of pixels in the $(N+1)^{th}$ frame image to be displayed;

a calculating module, configured to calculate backlight brightness data of a display screen according to the pixel data by a backlight algorithm; and a sending module, configured to in response to receiving an $(N+1)^{th}$ frame synchronization signal, synchronously send the $(N+1)^{th}$ frame image to be displayed and the backlight brightness data to the display screen and a backlight driving board respectively.

The embodiments of the present application further provide an electronic device, including:

one or more processors, and a memory; and one or more programs, wherein the one or more programs are stored in the memory and executed by the one or more processors, and the one or more program include instructions for executing the image display method described in any one of the above embodiments.

In some embodiments, the electronic device further includes a display screen, wherein the display screen includes a display panel and a backlight module, the display panel is arranged corresponding to the backlight module, the display panel includes a plurality of display sub-regions, the backlight module includes a plurality of backlight block units, and each of the plurality of display sub-regions corresponds to a plurality of backlight block units.

In some embodiments, the electronic device further includes a plurality of backlight driving boards, and each of the plurality of backlight driving boards is configured to scan line by line to drive a plurality of backlight block units corresponding to one of the plurality of display sub-regions.

The embodiments of the present application further provide a nonvolatile computer-readable storage medium of a computer program, wherein when the computer program is executed by one or more processors, the one or more processors are caused to execute the image display method described in any one of the above embodiments.

In the image display method, the image processing apparatus, the electronic device and the computer storage medium of the embodiments of the present application, in response to receiving an $N^{th}$ frame synchronization signal, an $(N+1)^{th}$ frame image to be displayed and pixel data of pixels in the $(N+1)^{th}$ frame image to be displayed are acquired, and backlight brightness data of a display screen are calculated according to the pixel data by a backlight algorithm; finally, in response to receiving an $(N+1)^{th}$ frame synchronization signal, the $(N+1)^{th}$ frame image to be displayed and the backlight brightness data are synchronously sent to the display screen and a backlight driving board respectively. In this way, the backlight driving board can control the backlight in the display screen for fine control according to the backlight brightness data, which improves the contrast of the display pictures on the display screen, and at the same time, prevents the overall brightness of the pictures on the display screen from being too bright, saves power consumption and improves the viewing experience of users.

Additional aspects and advantages of the present application will be set forth in part in the following description, and in part will be obvious from the following description, or may be learned by practice of the present application.

BRIEF DESCRIPTION OF DRAWINGS

The above and/or additional aspects and advantages of the present application will be apparent and easily understood from the following description of embodiments taken in conjunction with the accompanying drawings.

Figure 1:
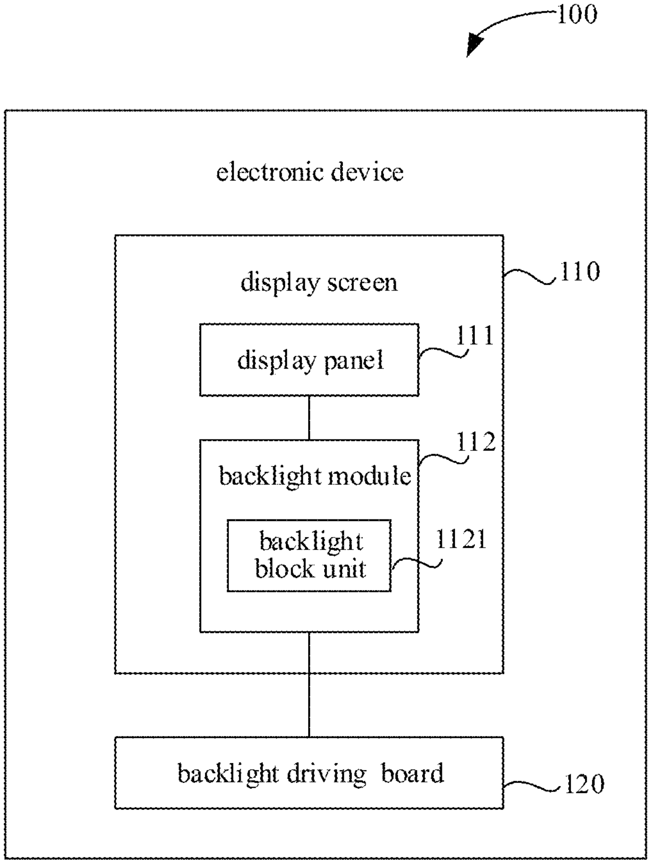
FIG. 1 is a schematic block diagram illustrating an electronic device according to some embodiments of the present application.

Symbol description of main components:

an image processing apparatus 10, an acquiring module 12, a calculating module 14, a sending module 16;

an electronic device 100, a display screen 110, a display panel 111, a backlight module 112, a backlight block unit 1121, a backlight driving board 120, a processor 20, a memory 30, a program 32, a storage medium 40, a computer program 42.

DETAILED DESCRIPTION

Hereinafter, the embodiments of the present application will be described in detail, and examples of the embodiments are illustrated in the accompanying drawings. Elements with the same or similar reference numerals indicate the same or similar elements or elements having the same or similar functions throughout. The embodiments described herein with reference to the accompanying drawings are exemplary and are intended to explain the present application, but not to be construed as limitations of the present application.

With the development of display technology and people's demands for clarity and contrast, the resolution and size of the liquid crystal display are gradually increasing. At present, 4 K liquid crystal display has been widely used, and 8 K liquid crystal display is gradually becoming popular. However, the larger the liquid crystal display is, the greater the power consumption is. The backlight of the existing liquid crystal display in the market is mostly a whole backlight, which needs to be lighted all the time, thus resulting in unnecessary waste. Moreover, because the screen is large, the picture of the liquid crystal display will be relatively bright as a whole, and watching it for a long time will cause discomfort to the human body.

Please refer to FIG. 1. In view of this, the present application provides an electronic device 100. The electronic device 100 includes a display screen 110 and a backlight driving board 120. The display screen 110 includes a display panel 111 and a backlight module 112, the display panel 111 is arranged corresponding to the backlight module 112, and the backlight driving board 120 is configured to drive the backlight module 112.

The electronic device 100 may be a television, a computer, a mobile phone, a tablet, or a smart wearable device such as an electronic watch, a VR device, an AR device or the like. For example, in some examples, the electronic device 100 may be a television, and the display screen 110 of the electronic device 100 refers to a television screen.

The display screen 110 may be a liquid crystal display (LCD). The display panel 111 is configured to display an image to be displayed, and the backlight module 112 is configured to generate backlight to cooperate with the display panel 111 to display the image to be displayed.

The display panel 111 may be divided into display sub-regions. The number of the display sub-regions may be four, six, eight or even more, and the specific number of the display sub-regions is not limited. For example, in the present application, there may be four display sub-regions, that is, the display panel 111 may be divided into four display sub-regions. Each of the display sub-regions includes a plurality of pixel units, and the display sub-region displays an image to be displayed through the pixel units.

Figure 2:
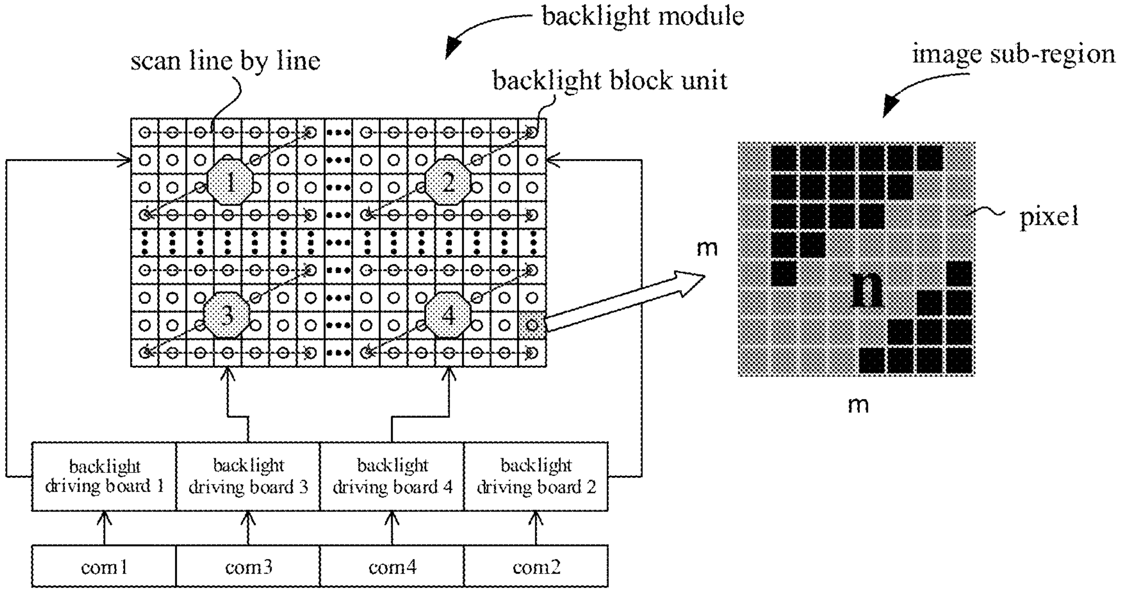
FIG. 2 is a schematic block diagram illustrating a backlight module connected with a backlight driving board according to some embodiments of the present application.

Please refer to FIG. 2. The backlight module 112 may be formed by a plurality of backlight block units 1121 arranged in arrays, and the backlight block units 1121 may be light-emitting elements such as OLEDs, Mini-LEDs or Micro-LEDs. For example, in the present application, Micro-LEDs may be used as the backlight block units 1121, that is, the backlight module 112 is formed by arranging a plurality of Micro-LEDs in an array.

In some embodiments, for each of display sub-regions, the display sub-region corresponds to a plurality of backlight block units 1121. For each of the display sub-regions, a plurality of backlight block units 1121 corresponding to the display sub-region are provided with one backlight driving board, and the one backlight driving board is connected with the plurality of backlight block units 1121 corresponding to the display sub-region. The backlight driving board is configured to scan line by line to drive a plurality of backlight block units 1121 corresponding to the display sub-region.

It can be understood that by partitioning the backlight of the display screen, the brightness of the backlight partition is finely controlled, thus improving the brightness of the television screen. If a display picture output by the host computer is input to a specific computing platform, the platform may read the picture content line by line and calculate the backlight data of the image, and then output the picture content to the screen. However, due to the limitation of calculating backlight, the backlight data of this frame lags behind the picture data by one frame. In addition, because the computing platform is located between the PC output and the screen display, the picture data is also one frame behind the original, which leads to the content displayed on the screen is one frame behind the original, and the backlight is two frames behind the original, which leads to the mismatch between the backlight brightness and the display picture, which affects the visual experience.

Figure 3:
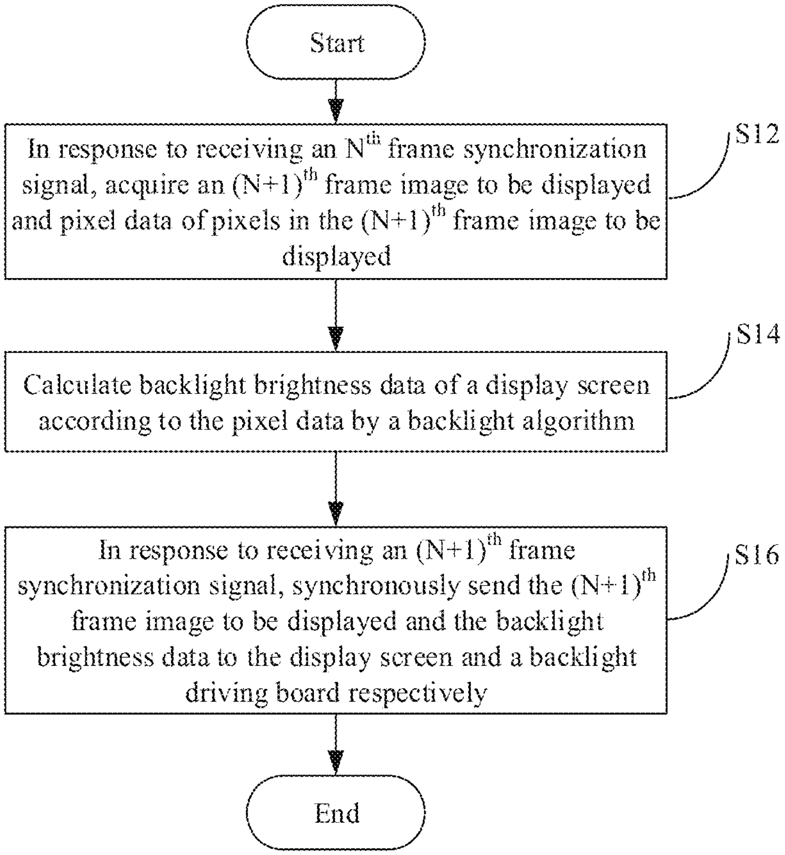
FIG. 3 is a flowchart illustrating a method of displaying an image according to some embodiments of the present application.

Therefore, referring to FIG. 3, the present application further provides an image display method, which includes the steps S12 to S16.

S12, in response to receiving an $N^{th}$ frame synchronization signal, an (N+1)th frame image to be displayed and pixel data of pixels in the (N+1)th frame image to be displayed are acquired.

S14, backlight brightness data of a display screen is calculated according to the pixel data by a backlight algorithm.

S16, in response to receiving an (N+1)th frame synchronization signal, the (N+1)th frame image to be displayed and the backlight brightness data are synchronously sent to the display screen and a backlight driving board respectively.

Figure 4:
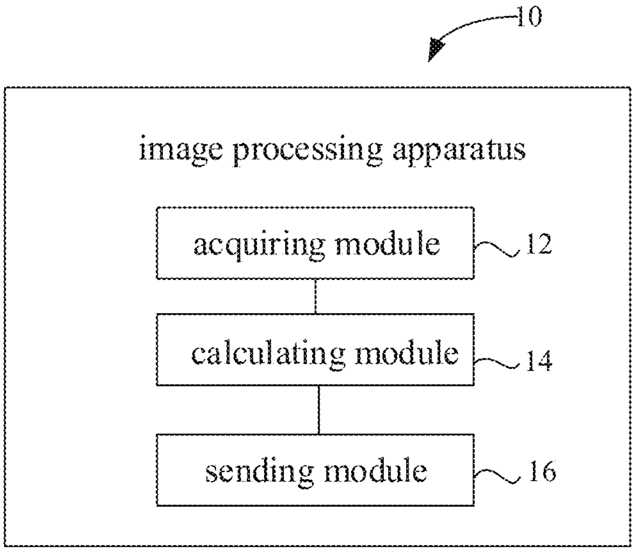
FIG. 4 is a schematic block diagram illustrating an apparatus of processing an image according to some embodiments of the present application.

Referring to FIG. 4, the embodiments of the present application further provide an image processing apparatus 10. The image processing apparatus 10 includes an acquiring module 12, a calculating module 14, and a sending module 16.

S12 may be implemented by the acquiring module 12, S14 may be implemented by the calculating module 14, and S16 may be implemented by the sending module 16.

In other words, the acquiring module 12 may be configured to in response to receiving an $N^{th}$ frame synchronization signal, acquire an $(N+1)^{th}$ frame image to be displayed and pixel data of pixels in the (N+1)th frame image to be displayed.

The calculating module 14 may be configured to calculate backlight brightness data of a display screen according to the pixel data by a backlight algorithm.

The sending module 16 may be configured to in response to receiving an $(N+1)^{th}$ frame synchronization signal, synchronously send the (N+1)th frame image to be displayed and the backlight brightness data to the display screen and a backlight driving board respectively.

Figure 5:
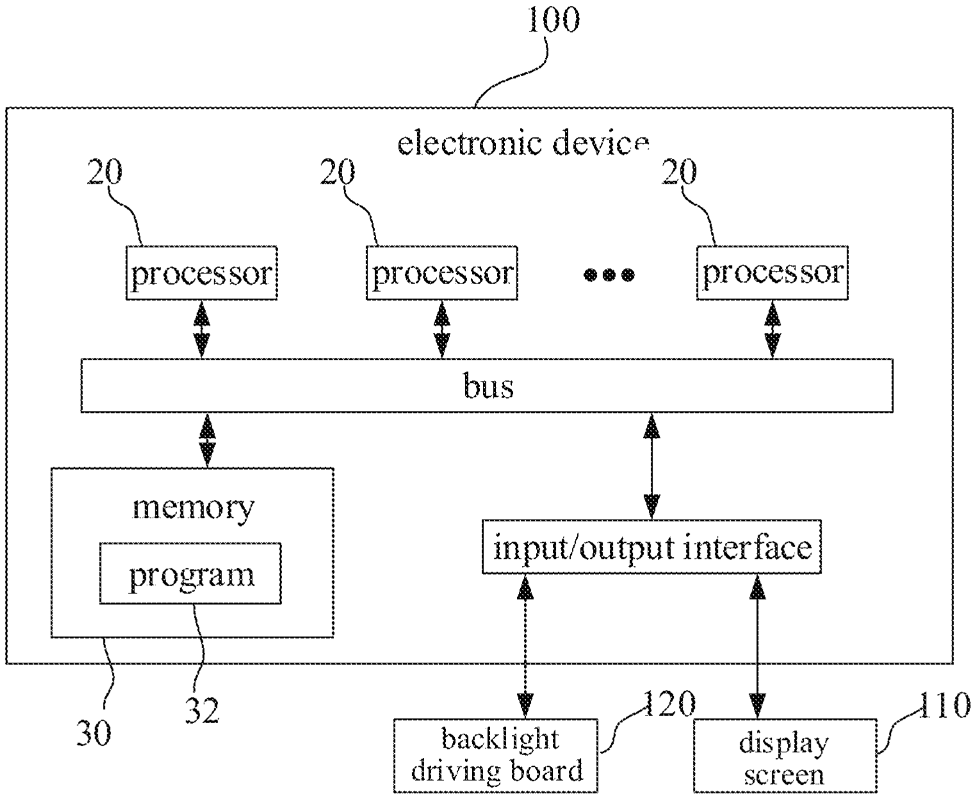
FIG. 5 is another schematic block diagram illustrating an electronic device according to some embodiments of the present application.

Please refer to FIG. 5. The electronic device 100 of the present application further includes one or more processors 20, a memory 30, and one or more programs 32, where the one or more programs 32 are stored in the memory 30 and executed by the one or more processors 20, and the one or more programs 32 include instructions for the processor 20 to execute the above image display method.

Figure 6:
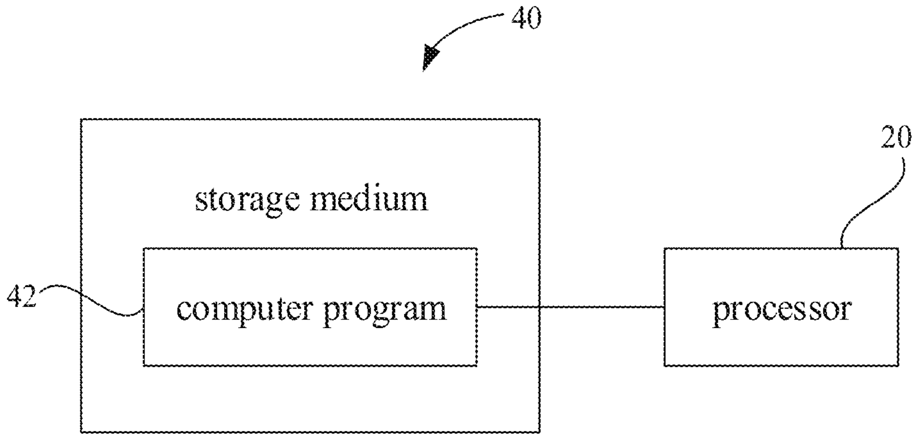
FIG. 6 is a schematic diagram illustrating a storage medium connected with a processor according to some embodiments of the present application.

Referring to FIG. 6, the embodiments of the present application further provide a nonvolatile computer-readable storage medium 40, and the readable storage medium 40 stores a computer program 42. The computer program 42, when executed by the one or more processors 20, causes the one or more processors 20 to execute the above image display method.

In the image display method, the image processing apparatus 10, the electronic device 100 and the storage medium 40 of the embodiments of the present application, in response to receiving an $N^{th}$ frame synchronization signal, an (N+1)th frame image to be displayed and pixel data of pixels in the $(N+_1)^{th}$ frame image to be displayed are acquired, and backlight brightness data of the display screen 110 are calculated according to the pixel data by a backlight algorithm; finally, in response to receiving an (N+1)th frame synchronization signal, the (N+1)th frame image to be displayed and the backlight brightness data are synchronously sent to the display screen 110 and the backlight driving board 120 respectively. In this way, the backlight driving board 120 can control the backlight in the display screen 110 for fine control according to the backlight brightness data, which improves the contrast of the display pictures on the display screen 110, and at the same time, prevents the overall brightness of the pictures on the display screen 110 from being too bright, saves power consumption and improves the viewing experience of users.

In some embodiments, the image processing apparatus 10 may be a part of the electronic device 100. In other words, the electronic device 100 includes the image processing apparatus 10.

In some embodiments, the image processing apparatus 10 may be a discrete component assembled in a certain manner to have the aforementioned functions, or a chip with the aforementioned functions exists in the form of an integrated circuit, or a computer software code segment that enables a computer to have the aforementioned functions when running on the computer.

In some embodiments, as hardware, the image processing apparatus 10 may be independent or added to a computer or computer system as an additional peripheral component. The image processing apparatus 10 may also be integrated into a computer or computer system. For example, when the image processing apparatus 10 is a part of the electronic device 100, the image processing apparatus 10 may be integrated into the processor 20.

In some embodiments where the image processing apparatus 10 is a part of the electronic device 100, as software, the code segments corresponding the image processing apparatus 10 may be stored in the memory 30 and executed by the processor 20 to achieve the aforementioned functions. In other words, the image processing apparatus 10 includes the above one or more programs 32, or the above one or more programs 32 include the image processing apparatus 10.

In some embodiments, the computer-readable storage medium 40 may be a storage medium built into the electronic device 100, such as the memory 30, or a storage medium that may be removably inserted into the electronic device 100, such as an SD card.

It should be noted that the RGB mode is a common physical color mode of the display screen, that is, an image is generally displayed on the display screen in the RGB mode, and the $(N+1)^{th}$ frame image to be displayed is used for display on the display screen. Therefore, the pixel data may be RGB pixel data. That is, the pixel data of pixels in the $(N+_1)^{th}$ frame image to be displayed is RGB pixel data.

RGB is designed based on the principle of color luminescence, and RGB includes three color channels of red, green and blue. The brightness level for each color may be divided into 256 levels of brightness. At a level of 0, the "light" is the weakest—it is turned off, and at a level of 255, the "light" is the brightest. When the gray levels of the three colors are the same, gray hues with different gray levels are generated. That is, when the gray levels of the three colors are all 0, it is the darkest black hue, and when the gray levels of the three colors are all 255, it is the brightest white hue. An RGB value refers to brightness and is expressed by an integer. Generally, R, G and B each have 256 levels of brightness, which are expressed by numbers as 0, 1, 2 . . . 254, 255.

It should also be noted that each pixel in the $(N+1)^{th}$ frame image to be displayed involves a set of pixel data, that is, if the pixel data is RGB pixel data, a pixel involves a set of RGB pixel data. When the $(N+1)^{th}$ frame image to be displayed is displayed on the display screen 110, each pixel can be represented by three pixel units.

Of course, it can be understood that if the physical color mode of the display screen 110 is other display modes, the pixel data may be pixel data corresponding to other display modes, that is, the pixel data may be image data displayed on various displays. For example, if the physical color mode of the display screen 110 is an RGBW mode, the pixel data may also be RGBW pixel data.

In addition, the electronic device 100 may further include a graphics processing unit (GPU), which is configured to render and generate an image to be displayed. The processor 20 may obtain the image to be displayed from the graphics processing unit. Because the image to be displayed is displayed on the display screen 110 in the form of a frame, the display screen 110 usually refreshes one frame image to be displayed every time it is refreshed. After the processor 20 obtains the $N^{th}$ frame synchronization signal, an image displayed on the display screen 110 is the $N^{th}$ frame image to be displayed, and after the processor 20 obtains the $(N+1)^{th}$ frame synchronization signal, an image displayed on the display screen 110 is the $(N+1)^{th}$ frame image to be displayed. The $(N+1)^{th}$ frame image to be displayed is divided into a plurality of image sub-regions, and each of the plurality of image sub-regions includes a plurality of pixels. The image sub-regions are in one-to-one correspondence with the backlight block units 1121.

Figure 7:
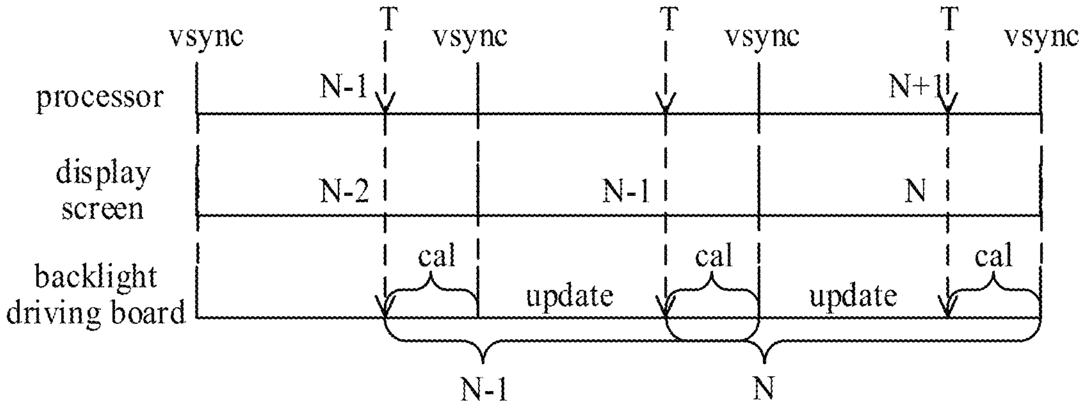
FIG. 7 is an implementation diagram illustrating a method of displaying an image according to some embodiments of the present application.

Please refer to FIG. 7, and those skilled in the related art can understand that the synchronization signal is a pulse signal with a preset frequency. The synchronization signal may be vertical synchronization signal (Vsync), and vertical synchronization is also called vertical hold. From the display principle of CRT display, a single pixel constitutes a horizontal scanning line, and the horizontal scanning line accumulates in the vertical direction to form a complete picture. The refresh rate of the display screen 110 is controlled by the graphics card DAC, and the graphics card DAC may generate a vertical synchronization signal after scanning a frame. The vertical synchronization signal indicates the end of the $N^{th}$ frame image to be displayed and the beginning of the $(N+1)^{th}$ frame image to be displayed.

It should be noted that the $N^{th}$ frame and the $(N+1)^{th}$ frame are used to distinguish the sequence of synchronization signals of two adjacent frames, where the $N^{th}$ frame synchronization signal precedes the $(N+1)^{th}$ frame synchronization signal, which does not substantially represent the synchronization signals of specific frames. For example, the synchronization signals include an $1^{th}$ frame synchronization signal, an $2^{th}$ frame synchronization signal and an $3^{th}$ frame synchronization signal arranged in sequence. With regard to the lth frame synchronization signal and the $2^{th}$ frame synchronization signal, the $1^{th}$ frame is the $N^{th}$ frame, and the $2^{th}$ frame is the $(N+1)^{th}$ frame. With regard to the $2^{th}$ frame synchronization signal and an $3^{th}$ frame synchronization signal, the $2^{th}$ frame is the $N^{th}$ frame, and the $3^{th}$ frame is the $(N+1)^{th}$ frame.

Please further refer to FIG. 2 and FIG. 7. In some embodiments, in response to receiving the $N^{th}$ frame synchronization signal, the processor 20 acquires the $(N+1)^{th}$ frame image to be displayed, and traverses pixels in the $(N+1)^{th}$ frame image to be displayed to obtain the pixel data of each pixel, and then calculates the backlight brightness data of each backlight block unit 1121 in the backlight module 112 through the backlight algorithm. It can be understood that when the $(N+1)^{th}$ frame image to be displayed is displayed on the display panel 111, the image sub-regions in the $(N+1)^{h}$ frame image to be displayed are in one-to-one correspondence with the backlight block units 1121 of the backlight module 112. Therefore, the brightness of the backlight block units 1121 may be obtained by processing the pixel data of the pixels in the $(N+1)^{th}$ frame image to be displayed.

In some embodiments, after calculating the backlight brightness data of each backlight block unit 1121, if the processor 20 receives the $(N+1)^{th}$ frame synchronization signal, it sends the $(N+1)^{th}$ frame image to be displayed to the display panel 111, and at the same time, it synchronously sends the backlight brightness data to a plurality of backlight driving boards 120 respectively.

In some embodiments, the display panel 111 includes a plurality of pixel units and a driving unit electrically connected with the pixel units. The plurality of pixel units correspond to the pixels in the $(N+1)^{th}$ frame image to be displayed, and the driving unit scans the plurality of pixel units line by line to drive the plurality of pixel units to display the $(N+1)^{th}$ frame image to be displayed. At the same time, the backlight driving board 120 scans line by line according to the backlight brightness data to drive the backlight block units 1121 corresponding to the display sub-region to emit light, so that the backlight generated by the backlight module 112 is synchronized with the image displayed on the display panel 111.

Figure 8:
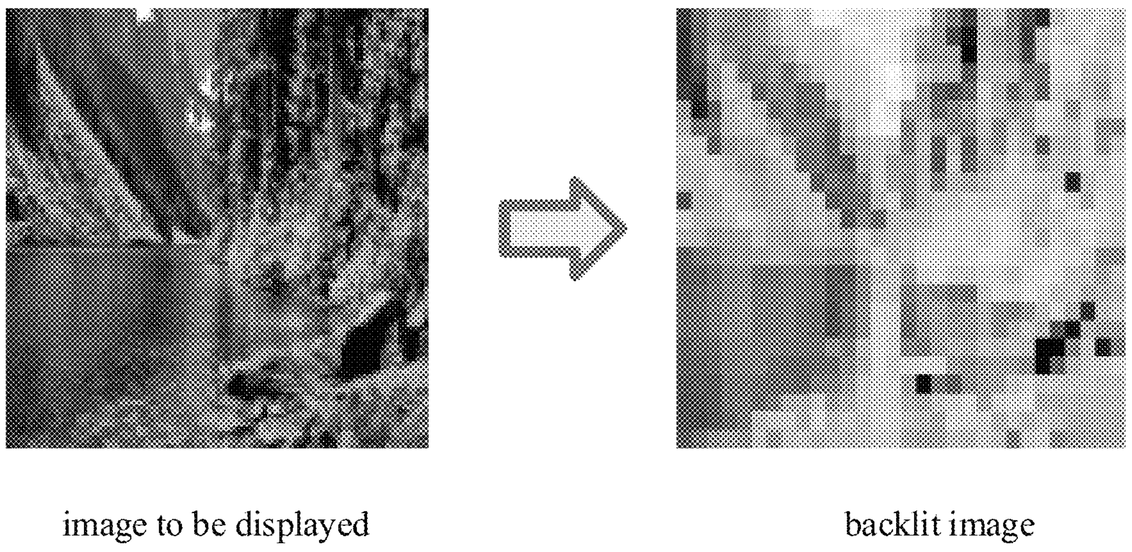
FIG. 8 is a schematic diagram illustrating a scene of a method of displaying an image according to some embodiments of the present application.

With reference to FIG. 8, it can be understood that the backlight generated by the backlight module 112 is related to an image to be displayed, thus the backlight image generated by the backlight module 112 due to the generation of the backlight corresponds to the image to be displayed.

In this way, it is ensured that the backlight brightness of the backlight module 112 matches the display picture of the display panel 111, and different backlight block units 1121 have different light emitting brightness, so that the contrast is increased when the display screen 110 displays an image to be displayed, thereby enhancing the visual effect. In addition, the backlight block units 1121 in the backlight module 112 have different brightness, which can effectively reduce the power consumption of the backlight module 112.

Figure 9:
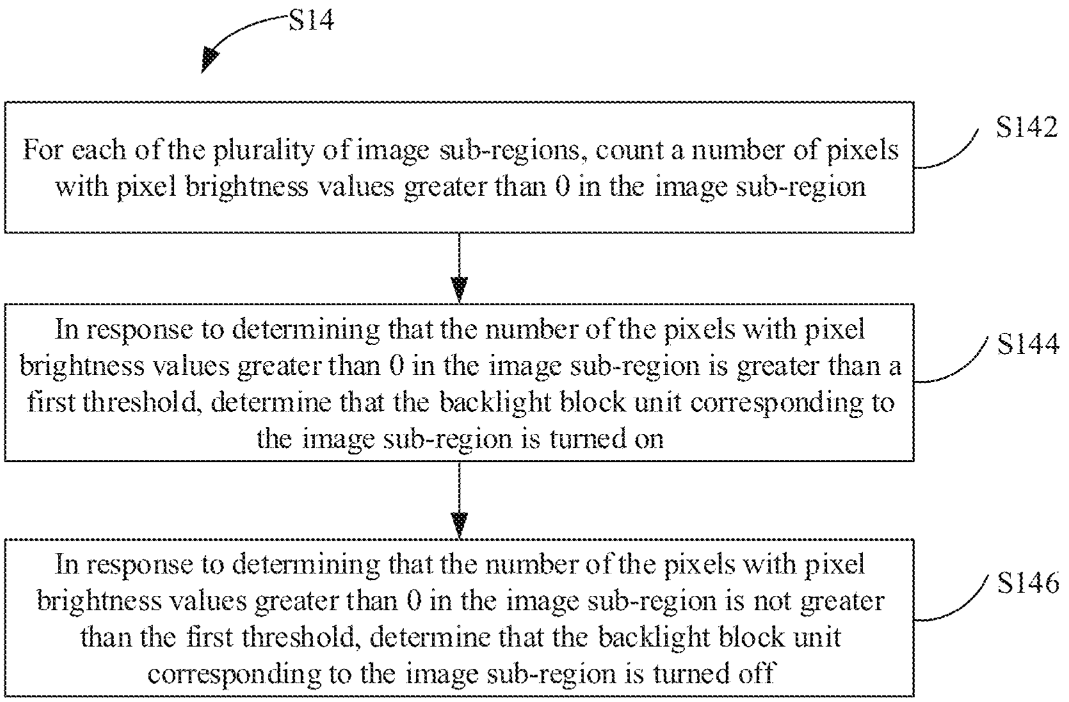
FIG. 9 is a flowchart illustrating a method of displaying an image according to some embodiments of the present application.

Referring to FIG. 9, in some embodiments, the step S14 includes the sub-steps S142 to S146.

S142, for each of the plurality of image sub-regions, a number of pixels with pixel brightness values greater than 0 in the image sub-region is counted.

S144, in response to determining that the number of the pixels with pixel brightness values greater than 0 in the image sub-region is greater than a first threshold, it is determined that the backlight block unit corresponding to the image sub-region is turned on.

S146, in response to determining that the number of the pixels with pixel brightness values greater than 0 in the image sub-region is not greater than the first threshold, it is determined that the backlight block unit corresponding to the image sub-region is turned off.

Please further refer to FIG. 4. In some embodiments, the steps S142, S144 and S146 may be implemented by the computing module 14. In other words, the calculating module 14 may be configured to for each of the plurality of image sub-regions, count a number of pixels with pixel brightness values greater than 0 in the image sub-region. The calculating module 14 may further be configured to in response to determining that the number of the pixels with pixel brightness values greater than 0 in the image sub-region is greater than a first threshold, determine that the backlight block unit corresponding to the image sub-region is turned on; and in response to determining that the number of the pixels with pixel brightness values greater than 0 in the image sub-region is not greater than the first threshold, determine that the backlight block unit corresponding to the image sub-region is turned off.

Please further refer to FIG. 5. In some embodiments, the processor 20 may be configured to for each of the plurality of image sub-regions, count a number of pixels with pixel brightness values greater than 0 in the image sub-region, and in response to determining that the number of the pixels with pixel brightness values greater than 0 in the image sub-region is greater than a first threshold, determine that the backlight block unit corresponding to the image sub-region is turned on. The processor 20 may further be configured to in response to determining that the number of the pixels with pixel brightness values greater than 0 in the image sub-region is not greater than the first threshold, determine that the backlight block unit corresponding to the image sub-region is turned off.

The first threshold refers to a value predefined by the electronic device 100, and may be adjusted according to the number of all pixels in the image sub-region. For example, if the number of all pixels in the image sub-region is 100, the first threshold may be 60, 62, 65, 70, 75, 80 or even larger values greater than or equal to 50. Or for example, the number of all pixels in the image sub-region is 1000, the first threshold may be 600, 620, 650, 700, 750 or 800 or other values equal to or greater than 500. It can be understood that the first threshold is used to compare with the number of pixels with pixel brightness values greater than 0, so as to determine to turn on or turn off a corresponding backlight block unit 1121. Therefore, the backlight block unit 1121 may be turned on as long as the number of pixels with pixel brightness values greater than 0 is more than half of the total number of pixels. For example, in some examples, if the number of pixels in the image sub-region is 10000, the first threshold may be 7000, that is, when the number of pixels with pixel brightness values greater than 0 is greater than 7000, it is determined that the backlight block unit 1121 corresponding to the image sub-region is turned on, otherwise, it is determined that the backlight block unit 1121 corresponding to the image sub-region is turned off.

In some embodiments, the processor 20 may process the pixel data of each pixel in each image sub-region to obtain the pixel brightness value of each pixel, and count the number of pixels with pixel brightness values greater than 0 in each image sub-region. If the number of pixels with pixel brightness values greater than 0 in the image sub-region is greater than the first threshold, it is determined that the backlight block unit 1121 corresponding to the image sub-region is turned on, otherwise, it is determined that the backlight block unit 1121 corresponding to the image sub-region is turned off. Thus, it is achieved to determine whether the backlight block unit 1121 is turned on or turned off according to RGB values of pixels in the image sub-region. In this way, after the (N+1)th frame synchronization signal is received, when the display module displays the (N+1)th frame image to be displayed, the backlight of the image sub-region that only needs backlight may be turned on, and the backlight of the image sub-region that does not need backlight may be turned off, thereby effectively reducing the power consumption of the display screen 110.

Figure 10:
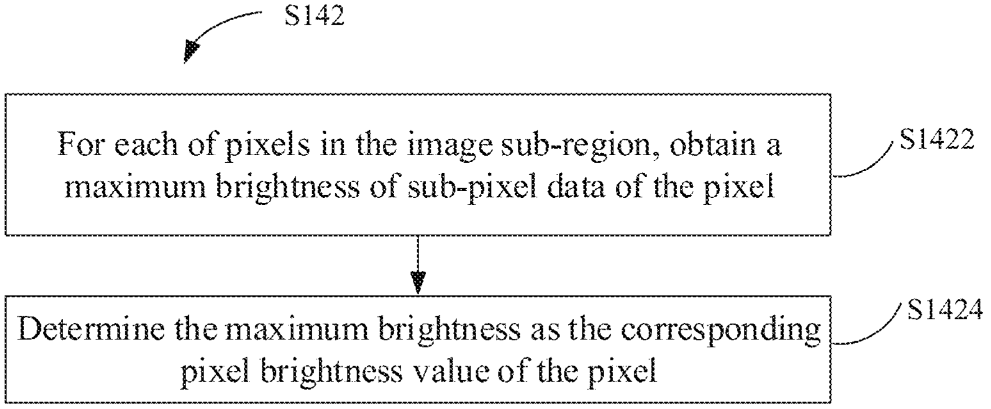
FIG. 10 is a flowchart illustrating a method of displaying an image according to some embodiments of the present application.

Referring to FIG. 10, in some embodiments, the step S142 includes the sub-steps S1422 to S1424.

S1422, for each of pixels in the image sub-region, a maximum brightness of sub-pixel data of the pixel is obtained.

S1424, the maximum brightness is determined as the corresponding pixel brightness value of the pixel.

In some embodiments, the sub-steps S1422 and S1424 may be implemented by the computing module 14. In other words, the calculating module 14 may be configured to for each of pixels in the image sub-region, obtain a maximum brightness of sub-pixel data of the pixel. The calculating module 14 may further be configured to determine the maximum brightness as the corresponding pixel brightness value of the pixel.

In some embodiments, the processor 20 may be configured to for each of pixels in the image sub-region, obtain a maximum brightness of sub-pixel data of the pixel. The processor 20 may further be configured to determine the maximum brightness as the corresponding pixel brightness value of the pixel.

It can be understood that the turn-on or turn-off of the backlight block unit 1121 corresponding to the image sub-region needs to be determined by the pixel brightness values of pixels in the image sub-region, each pixel in the image sub-region represents pixel data, and the pixel data is composed of sub-pixel data. Therefore, for each of the pixels, brightness values of the sub-pixel data of the pixel may be counted, the brightness values of the sub-pixel data may be compared to obtain a maximum brightness value of the sub-pixel data, and the maximum brightness value is determined as the pixel brightness value of the pixel. In this way, the pixel brightness values of pixels can be obtained, so that it is convenient to determine the number of pixels with pixel brightness values greater than 0 and realize the control of turning on or off the backlight block unit 1121.

For example, in the present application, the pixel data is RGB pixel data, where the RGB pixel data includes R pixel data, G pixel data and B pixel data. The formula for calculating the pixel brightness value of a pixel is as follows:

$$L_{pixel}=\max(r,g,b)\cdot\text{value}$$

Figure 11:
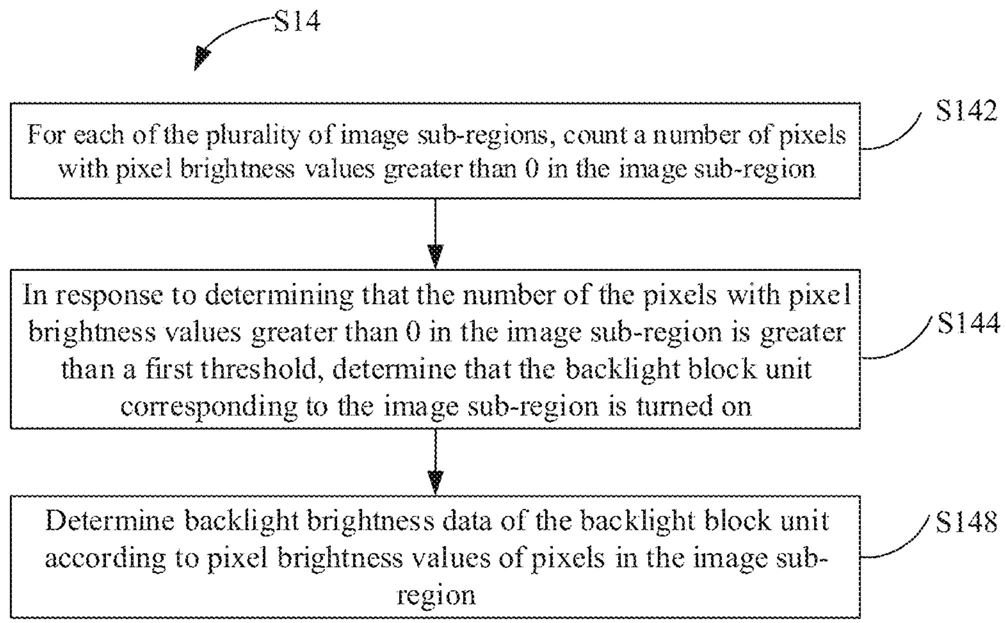
FIG. 11 is a flowchart illustrating a method of displaying an image according to some embodiments of the present application.

Please refer to FIG. 11. In some embodiments, after the sub-step S144, the step S14 further includes the sub-step S148.

S148, backlight brightness data of the backlight block unit is determined according to pixel brightness values of pixels in the image sub-region.

Further referring to FIG. 4, in some embodiments, the sub-step S148 may be implemented by the calculating module 14.

In other words, the calculating module 14 may further be configured to determine backlight brightness data of the backlight block unit according to pixel brightness values of pixels in the image sub-region.

In some embodiments, the processor 20 may further be configured to determine backlight brightness data of the backlight block unit according to pixel brightness values of pixels in the image sub-region.

In the above, only the turn-on or turn-off of the corresponding backlight block unit 1121 is determined according to the pixel brightness values of pixels in the image sub-region, and the backlight block units 1121 have the same brightness. Thus, it can be understood that the purpose of the sub-step S1442 is to determine the brightness of the backlight block unit 1121 to be turned on, so that the backlight brightness data of different backlight block units 1121 are different, that is, the backlight brightness data of different backlight block units 1121 are corrected and adjusted. In this way, the backlight of the backlight block units 1121 can further cooperate with the corresponding image sub-regions for display, thereby further enhancing the contrast of the images displayed on the display panel 111 and improving the visual experience.

In addition, it should be noted that the above step S148 is to determine the backlight brightness data of the backlight block unit corresponding to the image sub-region that is determined to be turned on. In the case that the backlight block unit corresponding to the image sub-region is determined to be turned off, the backlight brightness data of the backlight block unit may be 0.

Figure 12:
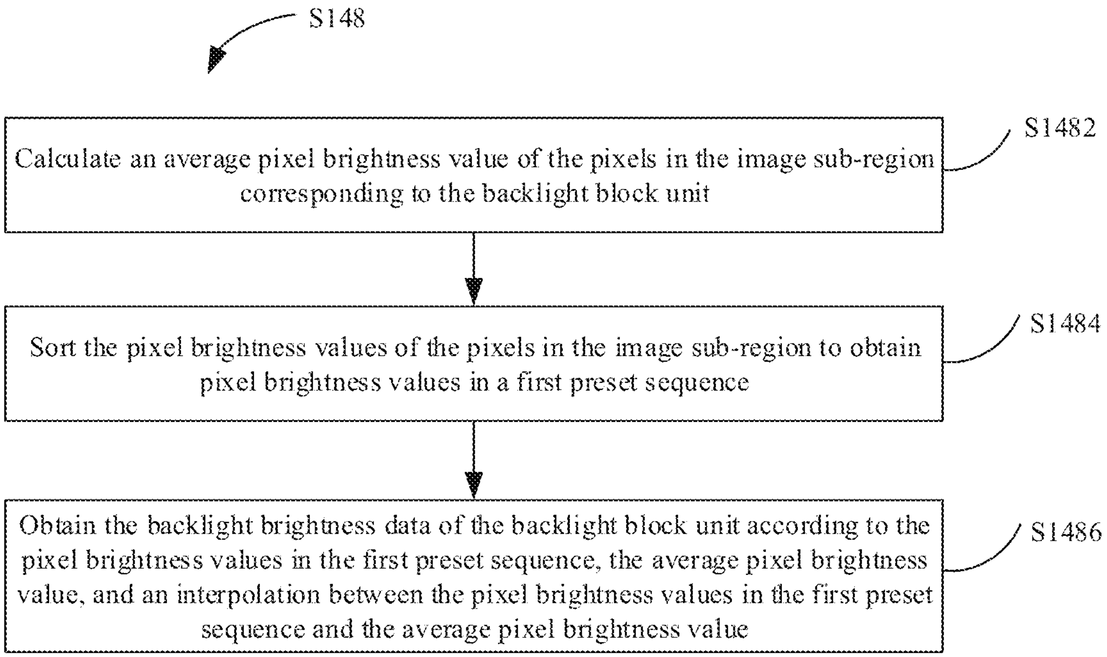
FIG. 12 is a flowchart illustrating a method of displaying an image according to some embodiments of the present application.

Please refer to FIG. 12. In some embodiments, the step S148 includes the sub-steps S1482 to S1486.

S1482, an average pixel brightness value of the pixels in the image sub-region corresponding to the backlight block unit is calculated.

S1484, the pixel brightness values of the pixels in the image sub-region are sorted to obtain pixel brightness values in a first preset sequence.

S1486, the backlight brightness data of the backlight block unit according to the pixel brightness values in the first preset sequence, the average pixel brightness value, and an interpolation between the pixel brightness values in the first preset sequence and the average pixel brightness value are obtained.

In some embodiments, the sub-steps S1482, S1484 and S1486 may be implemented by the computing module 14. In other words, the calculating module 14 may further be configured to calculate an average pixel brightness value of the pixels in the image sub-region corresponding to the backlight block unit, and sort the pixel brightness values of the pixels in the image sub-region to obtain pixel brightness values in a first preset sequence. The calculating module 14 may further be configured to obtain the backlight brightness data of the backlight block unit according to the pixel brightness values in the first preset sequence, the average pixel brightness value, and an interpolation between the pixel brightness values in the first preset sequence and the average pixel brightness value.

In some embodiments, the processor 20 may be configured to calculate an average pixel brightness value of the pixels in the image sub-region corresponding to the backlight block unit, and sort the pixel brightness values of the pixels in the image sub-region to obtain pixel brightness values in a first preset sequence. The processor 20 may further be configured to obtain the backlight brightness data of the backlight block unit according to the pixel brightness values in the first preset sequence, the average pixel brightness value, and an interpolation between the pixel brightness values in the first preset sequence and the average pixel brightness value.

In some embodiments, the pixel brightness values of all pixels in the image sub-region corresponding to the backlight block unit 112 are first obtained, the pixel brightness values of all pixels are accumulated and divided by the total number of all pixels to obtain an average pixel brightness value of all pixels, and the pixel brightness values of all pixels are sorted to determine pixel brightness values in the first preset sequence. Furthermore, an interpolation between the pixel brightness values in the first preset sequence and the average pixel brightness value is calculated, and finally the backlight brightness data of the backlight block unit is obtained according to the pixel brightness values in the first preset sequence, the average pixel brightness value, and the interpolation between the pixel brightness values in the first preset sequence and the average pixel brightness value.

In this way, the backlight brightness data of each backlight block unit 1121 may be obtained, so that the backlight driving board 120 can drive corresponding backlight block units 1121 according to the backlight brightness data of each backlight block unit 1121. Therefore, the fine control to the backlight of the backlight block unit 1121 is achieved.

It should be noted that the first preset sequence is a predefined value, and the value of the first preset sequence may be adjusted, which is not specifically limited. For example, in the present application, the value of the first preset sequence is 5%, and the specific calculation formula of the backlight brightness data of the backlight block unit 1121 is as follows:

$$\begin{cases} L_{backlight} = L_{avg} + k * \left(L_{dif} + \frac{L_{dif^2}}{255}\right) \\ L_{dif} = L_{0.05} - L_{avg} \\ K = 0.5 - \frac{L_{dif}}{255} * 0.5 \end{cases}$$

where, $L_{backlight}$ represents the backlight brightness data of the backlight block unit 1121 corresponding to a current image sub-region, $L_{avg}$ represents the average pixel brightness value of all pixels in the current image sub-region, $L_{0.05}$ represents the first 5% of the pixel brightness values after sorting all pixel brightness values, and $L_{dif}$ represents an interpolation between the first 5% of the sorted pixel brightness values and the average pixel brightness value.

In several embodiments provided by the present application, it should be understood that the disclosed systems, apparatuses and methods may be implemented in other manners. For example, the apparatus embodiments described above are merely exemplary. For example, the division of the units is merely logical function division, and may be other division in actual implementation, such as multiple units or components may be combined or integrated into another system, or some features may be ignored or not implemented. In addition, the mutual coupling or direct coupling or communication connection shown or discussed may be indirect coupling or communication connection through some interfaces, apparatuses or units, which may be electrical, mechanical or other forms.

In addition, functional units in each embodiment of the present application may be integrated into one processing unit, or each unit may exist physically alone, or two or more units may be integrated into one unit.

The above descriptions are merely specific embodiments of the present application, but are not intended to limit the protection scope of the present application. Any variation or replacement readily figured out by a person skilled in the art within the technical scope disclosed in the present application shall belong to the protection scope of the present application. Therefore, the protection scope of the present application shall be subject to the protection scope of the claims.

The invention claimed is:

1. A method of displaying an image, comprising:

in response to receiving an $N^{th}$ frame synchronization signal, acquiring pixel data of an $(N+1)^{th}$ frame image to be displayed, wherein N is a positive integer greater than zero;

calculating backlight brightness data of a display screen according to the pixel data of the $(N+1)^{th}$ frame image to be displayed; and in response to receiving an $(N+1)^{th}$ frame synchronization signal, synchronously sending the pixel data of the $(N+1)^{th}$ frame image to be displayed and the backlight brightness data to the display screen and a backlight driving board respectively.

2. The method according to claim 1, wherein the $(N+1)^{th}$ frame image to be displayed comprises a plurality of image sub-regions, each of the plurality of image sub-regions comprises a plurality of pixels, the display screen comprises a plurality of backlight block units, and the plurality of image sub-regions are in one-to-one correspondence with the plurality of backlight block units, and calculating the backlight brightness data of the display screen according to the pixel data comprises:

for each of the plurality of image sub-regions, counting a number of pixels with pixel brightness values greater than 0 in the image sub-region;

in response to determining that the number of the pixels with pixel brightness values greater than 0 in the image sub-region is greater than a first threshold, determining that the backlight block unit corresponding to the image sub-region is turned on; and in response to determining that the number of the pixels with pixel brightness values greater than 0 in the image sub-region is not greater than the first threshold, determining that the backlight block unit corresponding to the image sub-region is turned off.

3. The method according to claim 2, wherein counting the number of the pixels with pixel brightness values greater than 0 in the image sub-region comprises:

for each of pixels in the image sub-region, obtaining a maximum brightness of sub-pixel data of the pixel;

determining the maximum brightness as the corresponding pixel brightness value of the pixel.

4. The method according to claim 2, wherein determining that the backlight block unit corresponding to the image sub-region is turned on comprises:

determining backlight brightness data of the backlight block unit according to pixel brightness values of pixels in the image sub-region.

5. The method according to claim 4, wherein determining the backlight brightness data of the backlight block unit according to the pixel brightness values of the pixels in the image sub-region comprises:

calculating an average pixel brightness value of the pixels in the image sub-region corresponding to the backlight block unit;

sorting the pixel brightness values of the pixels in the image sub-region to obtain pixel brightness values in a first preset sequence; and obtaining the backlight brightness data of the backlight block unit according to the pixel brightness values in the first preset sequence, the average pixel brightness value, and an interpolation between the pixel brightness values in the first preset sequence and the average pixel brightness value.

6. The method according to claim 1, wherein the number of backlight driving boards is multiple, the display screen further comprises a plurality of display sub-regions, each of the plurality of display sub-regions corresponds to a plurality of backlight block units, and each of the plurality of display sub-regions is provided with one of the plurality of backlight driving boards, and synchronously sending the pixel data of the $(N+1)^{th}$ frame image to be displayed and the backlight brightness data to the display screen and the backlight driving board respectively comprises:

synchronously sending the backlight brightness data to the plurality of backlight driving boards respectively.

7. The method according to claim 6, further comprising:

for each of the plurality of backlight driving boards, controlling the backlight driving board to scan line by line according to the backlight brightness data, so as to drive a plurality of backlight block units corresponding to one of the plurality of display sub-regions.

8. The method according to claim 1, wherein the display screen comprises a plurality of pixel units, the plurality of pixel units correspond to pixels in the $(N+1)^{th}$ frame image to be displayed, and the method further comprises:

controlling the display screen to scan line by line to drive the plurality of pixel units to display the $(N+1)^{th}$ frame image to be displayed.

9. An electronic device, comprising:

one or more processors, and a memory; and one or more programs, wherein the one or more programs are stored in the memory and executed by the one or more processors, and the one or more program comprise instructions for executing operations comprising:

in response to receiving an $N^{th}$ frame synchronization signal, acquiring pixel data of an $(N+1)^{th}$ frame image to be displayed, wherein N is a positive integer greater than zero;

calculating backlight brightness data of a display screen according to the pixel data of the $(N+1)^{th}$ frame image to be displayed; and in response to receiving an $(N+1)^{th}$ frame synchronization signal, synchronously sending the pixel data of the $(N+1)^{th}$ frame image to be displayed and the backlight brightness data to the display screen and a backlight driving board respectively.

10. The electronic device according to claim 9, further comprising a display screen, wherein the display screen comprises a display panel and a backlight module, and the display panel is arranged corresponding to the backlight module, and the display panel comprises a plurality of display sub-regions, and the backlight module comprises a plurality of backlight block units, and each of the plurality of display sub-regions corresponds to a plurality of backlight block units.

11. The electronic device according to claim 10, further comprising a plurality of backlight driving boards, and each of the plurality of backlight driving boards is configured to scan line by line to drive a plurality of backlight block units corresponding to one of the plurality of display sub-regions.

12. A nonvolatile computer-readable storage medium of a computer program, wherein when the computer program is executed by one or more processors, the one or more processors are caused to execute operations comprising:

in response to receiving an $N^{th}$ frame synchronization signal, acquiring pixel data of an $(N+1)^{th}$ frame image to be displayed, wherein N is a positive integer greater than zero;

calculating backlight brightness data of a display screen according to the pixel data of the $(N+1)^{th}$ frame image to be displayed; and in response to receiving an $(N+1)^{th}$ frame synchronization signal, synchronously sending the pixel data of the $(N+1)^{th}$ frame image to be displayed and the backlight brightness data to the display screen and a backlight driving board respectively.

* * * * *